United States Patent [19]

Coleman

[11] Patent Number: 5,101,631
[45] Date of Patent: Apr. 7, 1992

[54] INTEGRAL RESERVOIR SEAL OF A MASTER CYLINDER

[75] Inventor: John R. Coleman, Dayton, Ohio

[73] Assignee: General Motors Corporation, Detroit, Mich.

[21] Appl. No.: 651,663

[22] Filed: Feb. 6, 1991

[51] Int. Cl.⁵ .................... B60T 11/26; F15B 7/08
[52] U.S. Cl. .................................................. 60/585
[58] Field of Search ............. 60/533, 562, 578, 585, 60/588

[56] References Cited

U.S. PATENT DOCUMENTS

| | | | |
|---|---|---|---|
| 3,206,933 | 9/1965 | Dega | 60/588 X |
| 3,357,181 | 12/1967 | Thirion | 60/588 |
| 3,609,875 | 10/1971 | Lewis et al. | 60/588 |
| 4,514,984 | 5/1985 | Kubota | 60/585 |
| 4,667,466 | 5/1987 | Mizusaki | 60/585 X |
| 4,671,065 | 6/1987 | Ishiwata | 60/533 |
| 4,934,144 | 6/1990 | Larin | 60/585 |
| 4,970,863 | 11/1990 | Cunningham | 60/585 |
| 4,989,498 | 2/1991 | Mori et al. | 60/588 X |

Primary Examiner—Edward K. Look
Assistant Examiner—John Ryznic
Attorney, Agent, or Firm—Ernest E. Helms

[57] ABSTRACT

A master cylinder assembly in which the plastic reservoir has mounting tubes fitting about mounting bosses or into recesses of mounting bosses of a master cylinder body. The tube outer ends have elastic seals integrally formed thereon which engage a wall surface of the mounting bosses in sealing relation. The seals may be lip type or O-ring type seals.

4 Claims, 1 Drawing Sheet

INTEGRAL RESERVOIR SEAL OF A MASTER CYLINDER

FIELD OF THE INVENTION

The invention relates to master cylinder reservoir seals on the mounting tubes of the reservoir body. These seals act between the tubes and the mounting bosses into which the tubes extend. The mounting bosses are parts of the master cylinder body and have fluid connections with the master cylinder bore.

BACKGROUND OF THE INVENTION

Master cylinders such as those commonly used in brake systems have had plastic brake fluid reservoirs mounted on the master cylinder bodies by means of mounting tubes integrally molded as part of the bottom of each reservoir. Each master cylinder body is provided with mounting bosses extending upwardly from the cylinder portion of the body. These bosses have recesses opening upwardly which receive the mounting tubes. Other master cylinders have used reservoir retaining fittings which are threaded or otherwise secured in the mounting boss recesses. Such fittings extend through openings in the bottom of the reservoir, and seals are provided between the bottom of the reservoir, the fittings, and the mounting bosses. Separate seals of various types have been employed to seal between each mounting tube and the wall of the recess into which it extends. Typical examples are shown in U.S. Pat. No. 4,309,937--Schardt; U.S. Pat. No. 4,373,333--Coleman; and U.S. Pat. No. 4,445,333--Coleman. In the Schardt patent, the retaining fittings are used, and O-ring seals are shown in recessed grooves at the tops of the mounting boss recesses. These O-ring seals are so located that they sealingly engage the bottom of the reservoir body and the retaining fittings as well as the mounting bosses. In the Coleman patents, the seals also fit in an interlocking manner with the mounting tubes and the mounting boss recesses so that they also retain the reservoir body on the master cylinder body.

SUMMARY OF THE INVENTION

The invention herein disclosed and claimed uses materials in the reservoir that are more elastic than those, such as hard nylon, that were used for some years. Elastic seals may now be integrally molded as parts of the mounting tubes instead of having to provide separate seals and, in some cases, grooves or other spaces for holding the seals. These integral elastic seals have O-ring or lip seal configurations molded as part of the reservoir body mounting tubes. The copolymer plastics of which reservoir bodies have been recently made are sufficiently elastic to act as seals in these areas, eliminating the need for rubber-like separate seals. They do not require additional clamps or retention devices.

DETAILED DESCRIPTION

Figure 1:
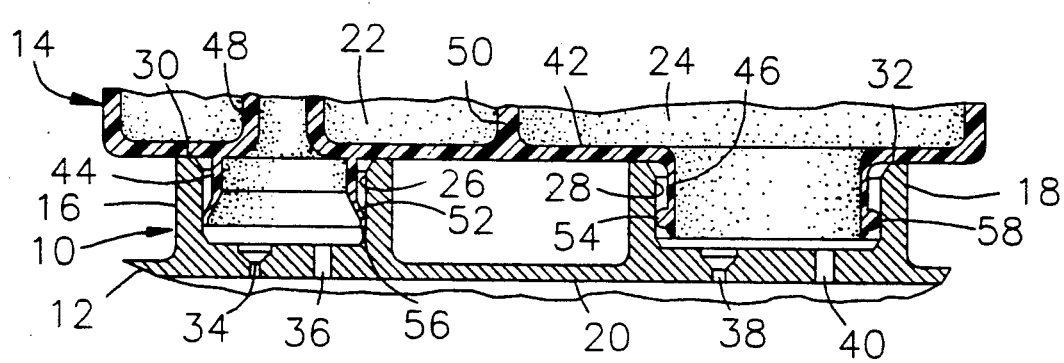
FIG. 1 is a fragmentary cross section view of a master cylinder assembly, illustrating relevant portions of the reservoir body and the master cylinder body and having integral seal constructions embodying the invention. Two different seal constructions are shown.

The master cylinder assembly 10 of FIG. 1 includes the master cylinder body 12 and the reservoir body 14. Body 12 has mounting bosses 16 and 18 extending upwardly therefrom to provide for mounting the reservoir body 14 and for the passage of brake fluid to and from the master cylinder bore 20 and the chambers 22 and 24 of the reservoir body. For simplicity, the pressurizing pistons and related structure are not shown in the drawing. However, such elements are well known, and some examples are illustrated in the prior art patents noted above. Mounting bosses 16 and 18 are provided with upwardly opening recesses 26 and 28, respectively. The upper end surfaces 30 and 32 of bosses 16 and 18 are arranged to contact the reservoir body 14. The master cylinder body 12 has bypass and compensation ports 34 and 36 in the bottom of recess 26 and bypass and compensation ports 38 and 40 in the bottom of recess 28. These ports function in the well-known manner to provide appropriate communication between sections of the master cylinder bore 20 and the reservoir chambers.

The reservoir body 14 has a bottom 42 serving both chambers 22 and 24. Mounting tubes 44 and 46 are integrally molded as part of reservoir bottom 42, and extend downwardly from the bottom. Tube 44 is also illustrated as extending upwardly above reservoir bottom 42. Its upward extension 48 terminates a short distance above reservoir bottom 42. This is a common arrangement to assure a supply of fluid to the other chamber 24 if for some reason there is a brake fluid leak which tends to deplete the fluid in chamber 22 beyond a predetermined level set by the location of the top end of the extension 48. A divider wall 50 may also be molded as a part of the reservoir body to separate chambers 22 and 24 to a predetermined level. As is also well known in the art, wall 50 may extend only part way up, or may extend to the top of the reservoir body 14.

The mounting tubes 44 and 46 are somewhat smaller in diameter than the diameters of the recesses 26 and 28. A seal 52 is intregally molded as a part of the mounting tube 44, and another seal 54 is intregally molded as a part of the mounting tube 46. Seal 52 is a lip type seal. It is flared outwardly so that its larger diameter lip end 56 engages the side wall of recess 26 in sealing relation. Seal 54 is another type of seal. It is essentially an O-ring seal which, instead of being separate, is molded as a part of mounting tube 46. Seal 54 extends radially outward from the main part of mounting tube 46 and its laterally outward surface 58 engages the side wall of mounting boss recess 28 in sealing relation. Seals 52 and 54 effectively prevent the escape of fluid from the interior of boss recesses 26 and 28 as brake fluid flows between the reservoir chambers 22 and 24 and the master cylinder bore 20 during master cylinder actuation and release. Because of the elastic nature of the copolymer material of which the reservoir body is made, seals 52 and 54 are sufficiently elastic to provide effective sealing.

Figure 2:
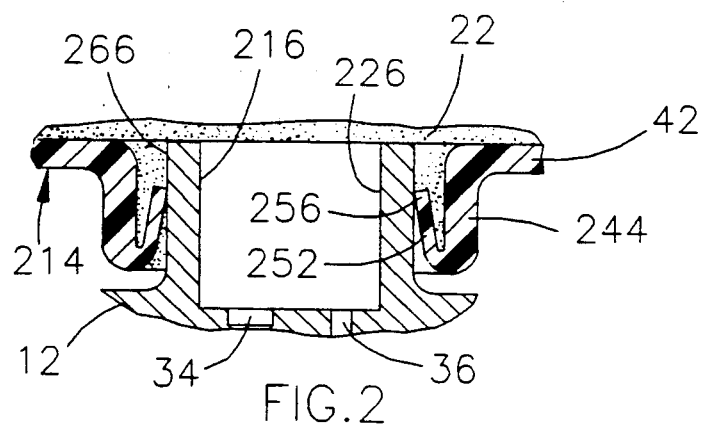
FIG. 2 is a fragmentary cross section view of another seal construction embodying the invention, with parts of one reservoir mounting tube and one master cylinder body mounting boss being illustrated. The mounting tube fits around the outside of the mounting boss and the seal engages the outer side surface of the mounting boss.

In FIG. 2, the master cylinder boss 216 is similar to boss 16, but is different in that the outer side surface 266 is finished so that a seal can engage it in sealing relation. Recess 226 still connects the reservoir chamber 22 with the master cylinder bore 20 through bypass and compensation ports 34 and 36 as does recess 26. The mounting tube 244 of reservoir body 214 extends from the reservoir bottom 42, much like mounting tube 46 of FIG. 1 does. The lower end of tube 244 is provided with a reversely connected, upwardly extending and inwardly flared lip seal 252, the end 256 of which is in sealing engagement with the outer side surface 266 of mounting boss 216. Seal 252 prevents leakage from reservoir chamber 22.

Figure 3:
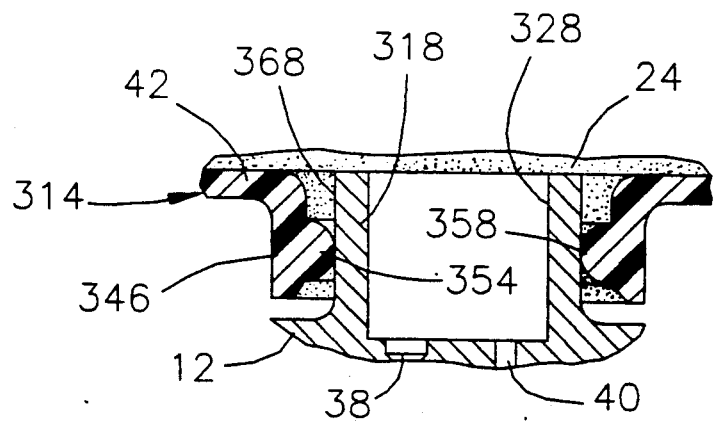
FIG. 3 is similar to FIG. 2 and shows still another seal construction embodying the invention.

In FIG. 3, the master cylinder boss 318 is similar to boss 216. Its outer side surface 368 is finished so that a seal can engage it in sealing relation. Recess 328 still connects the reservoir chamber 24 with the master cylinder bore 20 through bypass and compensation ports 34 and 36 as does recess 28. The mounting tube 346 of reservoir body 314 extends from the reservoir bottom 42, much like mounting tube 46 of FIG. 1 does. The lower end of tube 346 is provided with an integrally formed O-ring seal 354 which has its laterally inward surface 358 in sealing engagement with the outer side surface 368 of mounting boss 318. Seal 354 prevents leakage from reservoir chamber 24.

Any of the seal constructions shown and described can be used on any of the mounting tubes of a master cylinder reservoir body so long as the mounting bosses of the master cylinder body are configured to receive the seals of the mounting tubes in sealing relation. Seal constructions may have more than one lip type seal or more than one O-ring type seal formed on one mounting tube, or a combination of lip type and O-ring type seals, in sequential order. The reservoir body is easily installed with any of the modifications of the seals, and is satisfactorily sealed to prevent brake fluid leakage.

I claim:

1. A master cylinder reservoir body having at least one mounting tube extending outwardly therefrom, said mounting tube having an elastic seal integrally molded thereon adjacent the outer tube end, said seal being adapted to engage a wall of a master cylinder body mounting boss in sealing relation, and said elastic seal being a lip type seal and having its outer end adapted to engage the mounting boss wall in sealing relation and said elastic lip type seal being flared outwardly so that it is adapted to engage in sealing relation an inner wall defining a recess in the mounting boss into which said mounting tube is adapted to extend.

2. A master cylinder reservoir body having at least one mounting tube extending outwardly therefrom, said mounting tube having an elastic seal integrally molded thereon adjacent the outer tube end, said seal being adapted to engage a wall of a master cylinder body mounting boss in sealing relation, and said elastic seal being a lip type seal and having its outer end adapted to engage the mounting boss wall in sealing relation, and said elastic lip type seal being reversely bent and being flared inwardly so that it is adapted to engage in sealing relation an outer wall of the mounting boss around which said mounting tube is adapted to extend.

3. A master cylinder reservoir body having at least one mounting tube extending outwardly therefrom, said mounting tube having an elastic seal integrally molded thereon adjacent the outer tube end, said seal being adapted to engage a wall of a master cylinder body mounting boss in sealing relation, and said elastic seal being an O-ring type seal extending laterally outward from the end of said mounting tube so that it is adapted to engage in sealing relation an inner wall defining a recess in the mounting boss into which said mounting tube is adapted to extend.

4. A master cylinder reservoir body having at least one mounting tube extending outwardly therefrom, said mounting tube having an elastic seal integrally molded thereon adjacent the outer tube end, said seal being adapted to engage a wall of a master cylinder body mounting boss in sealing relation, and said elastic seal being an O-ring type seal extending laterally inward from the end of said mounting tube so that it is adapted to engage in sealing relation an outer wall of the mounting boss around which said mounting tube is adapted to extend.

* * * * *